(12) United States Patent
Moore et al.

(10) Patent No.: US 6,219,233 B1
(45) Date of Patent: Apr. 17, 2001

(54) EXTENDED THERMAL SOLUTION FOR PORTABLE PERSONAL COMPUTERS

(75) Inventors: Andrew Moore; Jeff Brostrom, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,771

(22) Filed: Jan. 26, 1999

(51) Int. Cl.[7] .................................................. G06F 1/20
(52) U.S. Cl. ........................ 361/687; 361/679; 361/686; 361/688; 361/690; 361/697
(58) Field of Search ..................................... 361/679, 686, 361/687, 688, 690, 697

(56) References Cited

U.S. PATENT DOCUMENTS

| | | |
|---|---|---|
| 5,371,858 | 12/1994 | Miller et al. . |
| 5,694,294 | 12/1997 | Ohashi et al. . |
| 5,704,212 * | 1/1998 | Erler et al. ............................ 62/3.2 |
| 5,974,556 * | 12/1999 | Jackson et al. ....................... 713/322 |

* cited by examiner

Primary Examiner—Gerald Tolin
Assistant Examiner—Yean-Hsi Chang
(74) Attorney, Agent, or Firm—Haynes and Boone, L.L.P.

(57) ABSTRACT

An extended cooling unit ("ECU") for a portable PC is described. The ECU is connected to the portable PC having an MPP processor via a docking connector of the PC, thereby allowing the presence of the ECU to be detected by the processor. The ECU is connected to the portable PC via a docking connector of the PC, thereby allowing the presence of the ECU to be detected by the MPP processor of the PC. The ECU includes a horizontally projecting, thermally-conductive plate positioned such that, when the ECU is connected to the PC, the plate projects under the bottom of the PC to allow extension of a passive cooling solution. The ECU also includes a fan attached to a heat exchanger. Connection of the ECU to the PC results in a portion of the thermally conductive path of the ECU being brought into direct contact with the conductive path of the processor of the PC, thereby increasing the cooling capacity in the critical portion of the PC.

14 Claims, 3 Drawing Sheets

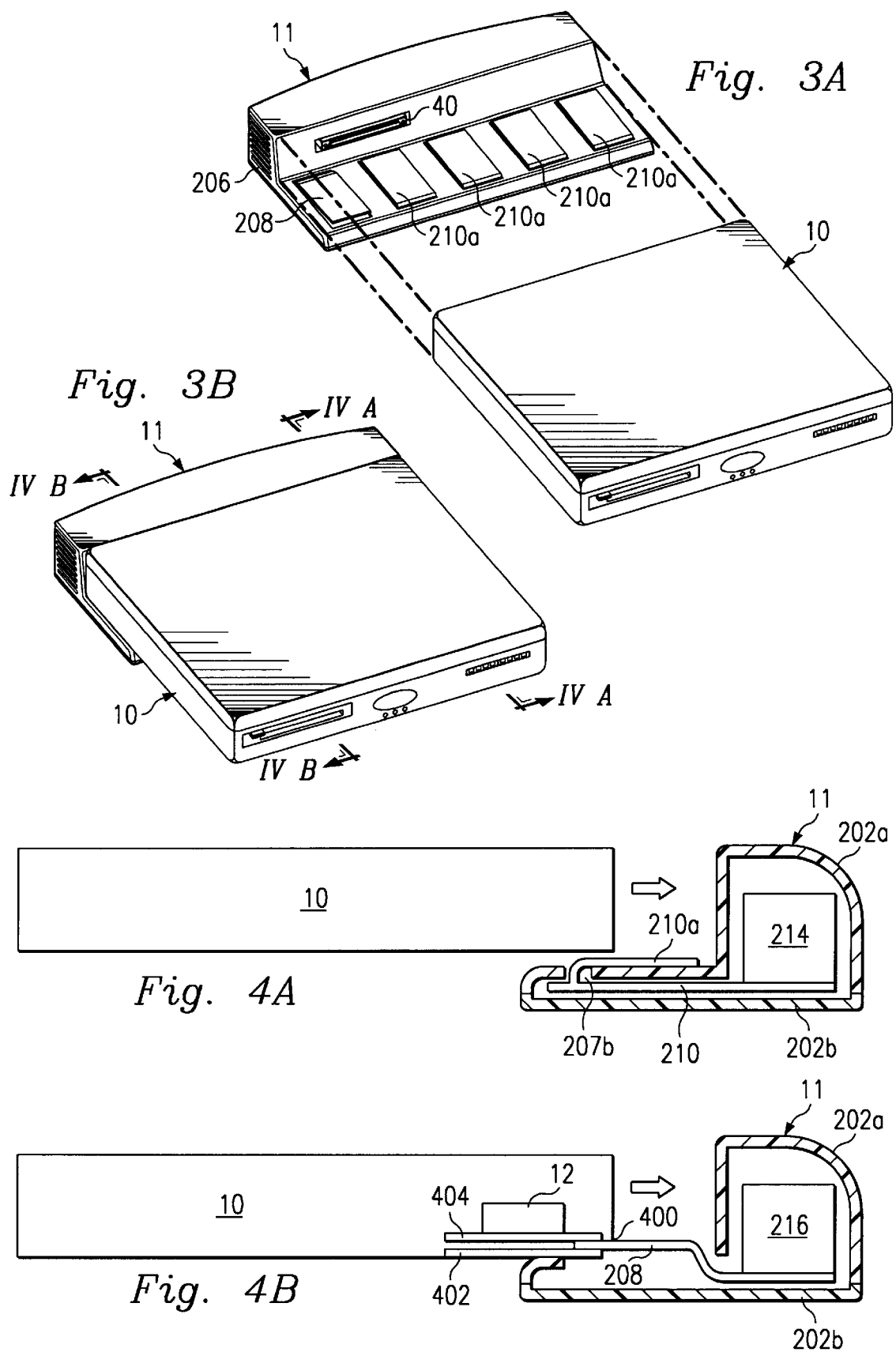

EXTENDED THERMAL SOLUTION FOR PORTABLE PERSONAL COMPUTERS

BACKGROUND

One embodiment relates generally to portable personal computers ("PCs") and, more particularly, to an extended thermal solution for a portable PC.

Intel Corporation's "Geyserville" processor, expected to be made publicly available in 1999, is an MPP processor designed to support multiple power and performance modes in a portable PC, depending on the power source and auxiliary cooling available. For example, in normal portable (i.e., battery-powered) applications, the processor will be limited to approximately 10.5 watts of power dissipation. In docked modes, where unlimited AC power and additional cooling is available, an additional 10 watts, for a total of approximately 20.5 watts, of power dissipation is possible.

Clearly, it would be desirable to utilize the additional wattage available during battery-powered operation of the PC. Therefore, what is needed is an extended thermal solution for a portable PC to make this additional wattage available for use during portable, as well as docked, applications.

SUMMARY

One embodiment, accordingly, is an extended cooling unit ("ECU") for a portable PC having an MPP processor, such as Intel's "Geyserville" processor described above. The ECU is connected to the portable PC via a docking connector of the PC, thereby allowing the presence of the ECU to be detected by the MPP processor of the PC. The ECU includes a horizontally projecting, thermally-conductive plate positioned such that, when the ECU is connected to the PC, the plate projects under the bottom of the PC to allow extension of a passive cooling solution. The ECU also includes a fan attached to a heat exchanger. Connection of the ECU to the PC results in a portion of the thermally conductive path of the ECU being brought into direct contact with the conductive path of the processor of the PC, thereby increasing the cooling capacity in the critical portion of the PC.

The PC can be connected to an AC power source via an AC adapter inserted into a receptacle in the ECU, which passes the power through to the PC in the same manner as a port replicator.

A technical advantage achieved with the ECU is that it enables the processor to be operated in a higher power consumption/performance mode than previously possible while the PC is being used in a normal portable (i.e., undocked) application.

Another technical advantage achieved with the ECU is that its presence is detected by the same software used to detect the presence of a docking station, such that the PC functions as if it is docked.

BRIEF DESCRIPTION OF THE DRAWINGS

FIGS. 3A and 3B illustrate connection of the ECU of FIG. 1 to the portable PC of FIG. 1.

FIG. 4A is a cutaway view of the ECU/PC of FIG. 3B along a line IVA—IVA.

FIG. 4B is a cutaway view of the ECU/PC of FIG. 3B along a line IVB—IVB.

DESCRIPTION OF THE PREFERRED EMBODIMENT

Figure 1:
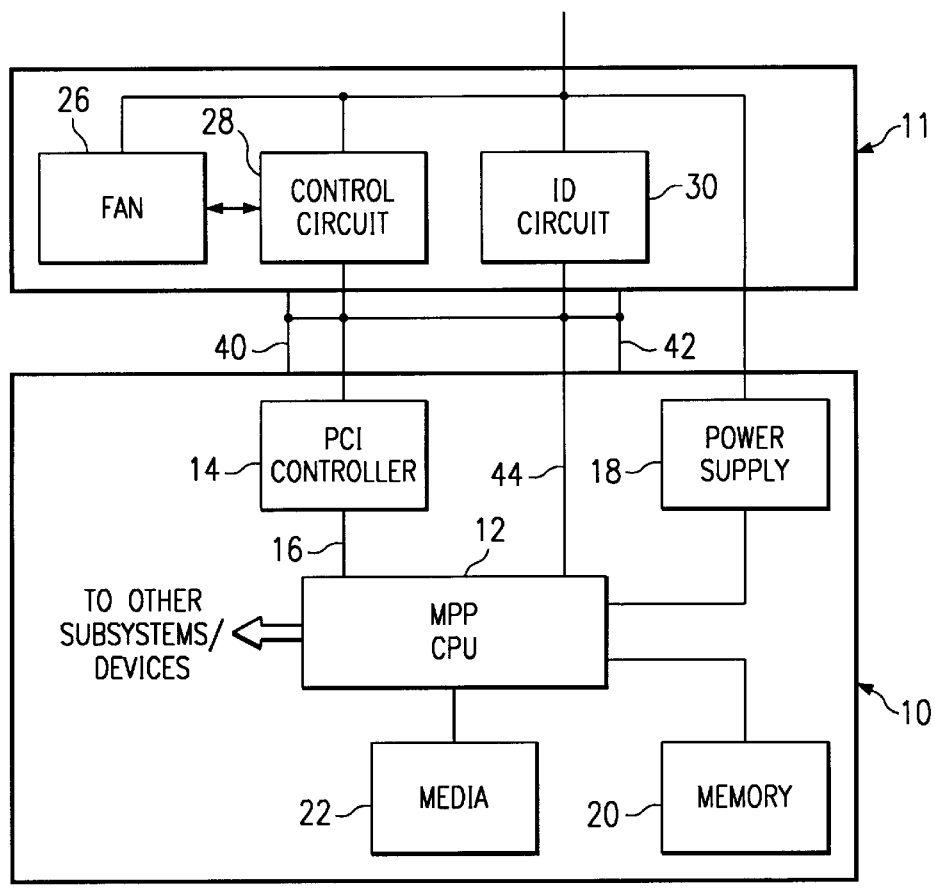
FIG. 1 is a system block diagram of a portable PC having an MPP processor and having connected thereto an ECU of one embodiment.

FIG. 1 is a system block diagram of a portable PC 10 having an ECU 11 of one embodiment connected thereto. The PC 10 includes a multiple power and performance ("MPP") processor embodied as a CPU 12. The CPU 12 is connected to a PCI controller 14 via a PCI bus 16 and to a power supply 18, memory 20, and media 22 via various other buses. It will be recognized that the PC 10 includes various other subsystems and components that, because they are not essential to facilitate a complete understanding of the present embodiment, are not shown or described herein in greater detail.

The ECU 11 includes a fan 26, a control circuit 28 for controlling the operation of the fan, and an ID circuit 30, the function of which will be described in greater detail below. The ECU 11 is connected to the PC 10 via a docking connector 40 designed to mate with a conventional docking connector 42 provided on the PC 10. It will be recognized that the usual purpose of the docking connector 42 is to enable the PC 10 to be docked to a docking station (not shown). The ECU 11 is thereby connected through the docking connectors 40, 42 to the CPU 12 in two manners. First, an unused pin on the docking connector is grounded by the ID circuit 30. BIOS detects this pin to inform the CPU 12, via an ID pin line 44, of the presence of the ECU 11, thus permitting the CPU to be run in higher power consumption/performance modes. In addition, the CPU 12 controls the operation of the fan 26 via the PCI bus 16 and PCI controller 14, although a number of different control methods, such as through use of other unused pins of the docking connector 42, may also be possible. Power is passed through the docking connectors 40, 42, to the PC 10 in the same manner as with a port replicator. In particular, an AC adapter (not shown) may be connected to a DC-IN input 48 for providing DC power to the ECU 11 and PC 10 from an AC outlet (not shown).

In addition, it would be possible to enable variable voltage to the fan 26 from the PCI controller 14 and control circuit 28 to control the speed thereof, as directed by the CPU 12.

Figure 2A:
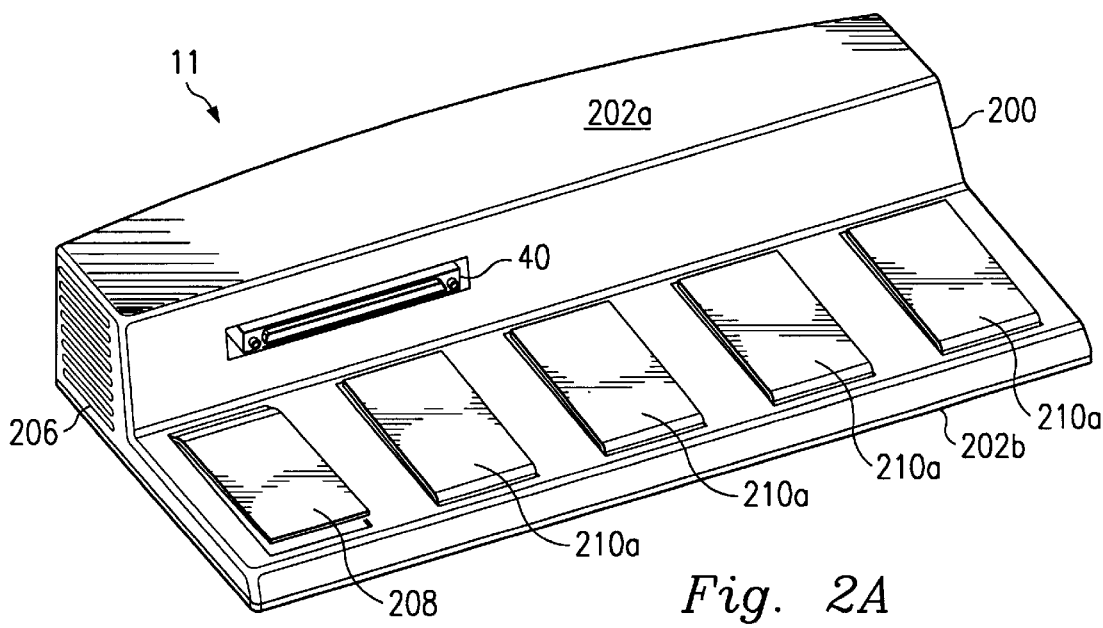
FIG. 2A is an isometric view of the ECU of FIG. 1.

FIG. 2A is an isometric view of an ECU 11 of one embodiment for use with the PC 10. As shown in FIG. 2A, the ECU 11 includes a housing 202 made up of a top housing portion 202a and a bottom housing portion 202b. The docking connector 40, see also FIG. 1, is accessible through the top housing portion 202a, and an inlet vent 206 is provided through the top housing portion 12a at one end thereof for purposes that will be described in greater detail with reference to FIG. 2B. The docking connector 40 is designed to mate with the docking connector 42 of the PC 10 and is positioned such that, when the docking connector 40 is connected to the docking connector 42, a contact area 207 of the ECU 11 projects beneath the bottom of the PC 10, as more clearly shown in FIGS. 3A and 3B.

Referring again to FIGS. 2A and 2B, a contact area 207 includes a first opening 207a through which a portion of a CPU thermal path element 208 is exposed. The contact area 207 further includes a plurality of second openings 207b through which portions of a system thermal path element 210, specifically, spring elements 210a, are exposed. As shown in FIG. 4A, when the ECU 11 is connected to the PC 10 as previously described, the spring elements 210a of the system thermal path element 210 extend through the openings 207b to make contact with the bottom of the PC 10, thereby to provide additional heat absorption as described in greater detail below.

Additionally, as shown in FIG. 4B, when the ECU 11 is connected to the PC 10 via the docking connectors 40, 42, the exposed portion of the CPU thermal path element 208 will project into a slot 400 provided in the PC 10 and be forced, via ramped internal ribs 402, into contact with a CPU thermal spreader 404 inside the PC 10. Using the slot 400 avoids potential for contact with hot metal surfaces and the ribs 402 give higher contact pressure appropriate to higher power conduction. In this manner, the ECU 11 is able to absorb a substantial amount of the heat generated by the CPU 12, as described in greater detail below.

Figure 2B:
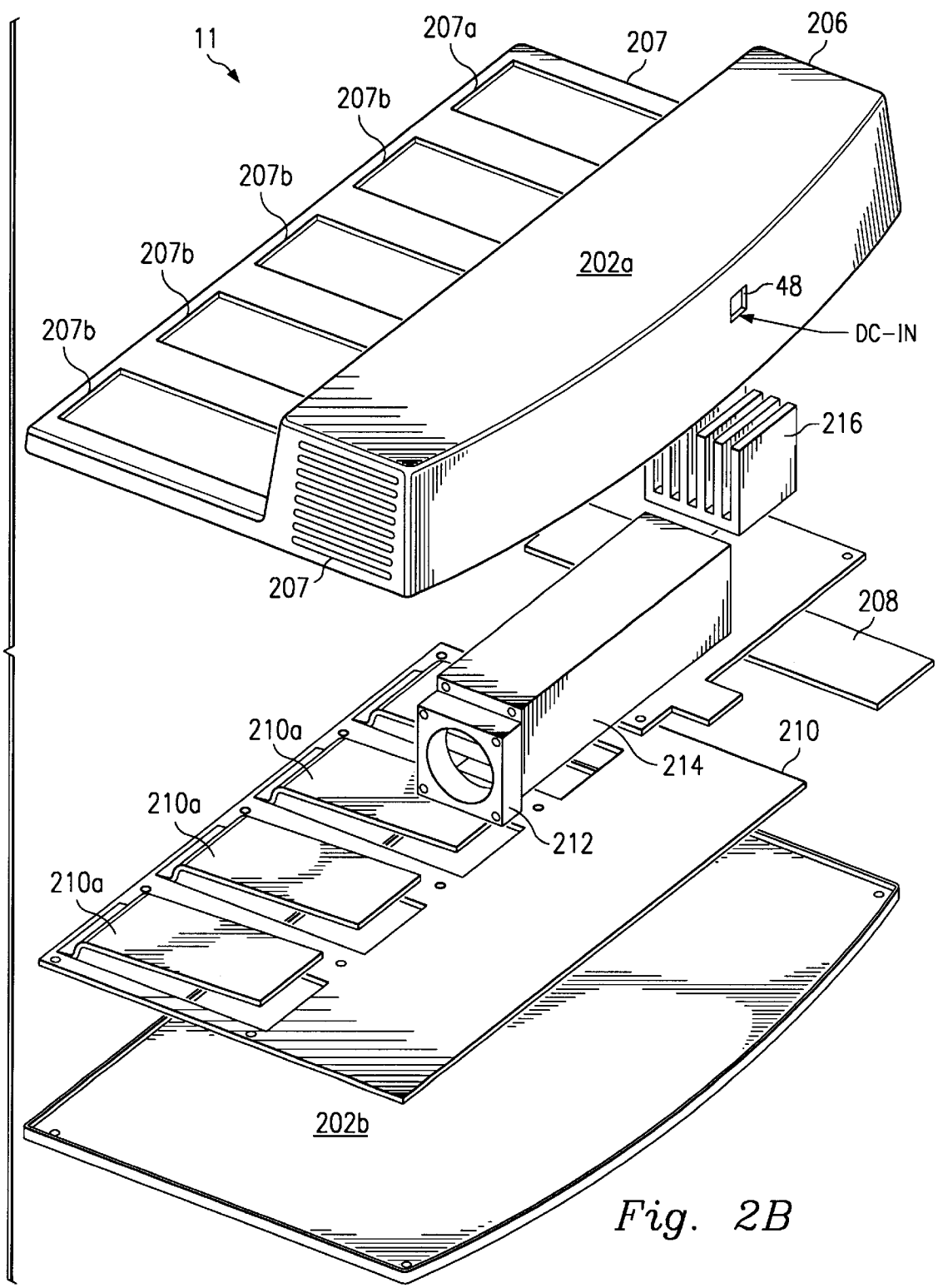
FIG. 2B is an exploded view of the ECU of FIG. 1.

As best shown in FIG. 2B, an exit vent 207 is provided through the top housing portion 202a at an end thereof opposite the inlet vent 206. A fan 212, a heat exchanger 214, and a CPU heat sink 216 are disposed within the housing 200 such that air is drawn into the ECU 11 by the fan 212 though the inlet vent 206, passed through the CPU heat sink 216 to cool the CPU thermal path element 208 and, thereby, to cool the CPU 12. The air is then drawn through the heat exchanger 214, where it is used to cool the system thermal path element 210, and hence to provide additional cooling to the PC 10, after which it is expelled by the fan 212 through the exit vent 207.

As also best shown in FIG. 2B, the DC-IN receptacle 48 is provided in the top housing portion 202a for receiving an AC adapter such that AC power from an AC outlet (not shown) may be provided to the PC 10 through the ECU 11 via the docking connectors 40, 42.

FIGS. 3A and 3B illustrate connection of the ECU 11 to the PC 10. As previously suggested, when the docking connector 40 is mated with the docking connector 42, the PC 10, and more specifically, the CPU 12, perceives the PC as having been "docked" and therefore enables the use of a higher power consumption/performance mode than would otherwise be the case for an undocked PC. Accordingly, the PC can be used at a higher power consumption/performance mode without having to be docked. FIG. 3A is a perspective view of the ECU 11 in proper position for connection to the PC 10. FIG. 3B is a perspective view of the ECU 10 once it has been connected to the PC 10.

FIGS. 4A and 4B, described above, illustrate cutaway views of the PC 10/ECU 11 of FIG. 3B along a line IVA—IVA and IVB—IVB, respectively.

Accordingly, the embodiment of the ECU described herein enables a portable PC having an MPP processor to make use of higher power consumption/performance modes of the processor without having to dock the PC, as would typically be the case.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. An extended cooling apparatus for connection to a personal computer ("PC") having a docking connector, the apparatus comprising:
   a housing including a top housing portion and a bottom housing portion, the top housing portion including a first opening adjacent a plurality of separated side-by-side second openings, the bottom housing portion including a thermally conductive plate comprising a plurality of system thermal path elements extending through the second openings for positioning under the PC for providing a passive cooling solution;
   a docking connector designed to mate with the docking connector of the PC, wherein the PC is able to detect connection of the apparatus thereto via the docking connectors;
   a CPU thermal path element extending through the first opening and disposed within the housing for projecting into the PC to underlie a CPU thereof to absorb heat therefrom; and
   a fan disposed within the housing for cooling the system thermal path and the CPU thermal path.

2. The apparatus of claim 1 wherein the system thermal elements extending exposed through the second openings comprise a plurality of spring fingers for contacting a bottom surface of the PC.

3. The apparatus of claim 1 wherein the top housing portion further includes an inlet vent and an exit vent disposed on opposite sides of the fan.

4. The apparatus of claim 1 further comprising a heat sink thermally connected to the CPU thermal path element.

5. The apparatus of claim 1 further comprising a heat exchanger thermally connected to the system thermal path element.

6. The apparatus of claim 1 further comprising:
   a heat sink disposed proximate the CPU thermal path element; and
   a heat exchanger disposed proximate the system thermal path element;
   wherein the fan draws air into the apparatus via an inlet vent of the top housing portion through the heat sink and the heat exchanger and expels the air out of the apparatus via an exit vent of the top housing portion.

7. The apparatus of claim 1 further comprising a receptacle for receivng an AC adapter for receiving power to power the apparatus and the PC.

8. A computer system comprising a portable computer having a processor capable of operating in multiple power consumption and performance ("MPP") modes and an extended cooling unit ("ECU") for connection to the portable computer via complementary docking connectors thereof, the portable computer comprising means for detecting connection of a device thereto via the docking connector thereof and, responsive to the detection, causing the processor to operate in a higher MPP mode than when no device is connected thereto, and the ECU comprises means for providing additional cooling to the portable computer when the ECU is connected to the portable computer via the complementary docking connectors wherein the ECU further comprises:
   a housing including a top housing portion and a bottom housing portion, the top housing portion including a first opening adjacent a plurality of separated side-by-side second openings, the bottom housing portion including a thermally conductive plate comprising a plurality of system thermal path elements extending through the second openings for positioning under the PC for providing a passive cooling solution;
   a CPU thermal path element extending through the first opening and disposed within the housing for projecting into the PC to underlie a CPU thereof to absorb heat therefrom; and
   a fan disposed within the housing for cooling the system thermal path element and the CPU thermal path element.

9. The computer system of claim 8 wherein the portable computer comprises a slot for receiving the CPU thermal path element within the portable computer such that the CPU thermal path element projects beneath the processor when the ECU is connected to the portable computer.

10. The computer system of claim 9 wherein the portable computer further comprises ramped internal ribs disposed proximate the slot for forcing the CPU thermal path element into contact with a CPU thermal spreader disposed on a bottom surface of the processor.

11. The computer system of claim 1 wherein the system thermal path elements extending through the second openings comprise a plurality of spring fingers for contacting a bottom surface of the portable computer when the ECU is connected to the portable computer.

12. The computer system of claim 1 wherein the top housing portion further includes an inlet vent and an exit vent disposed on opposite sides of the fan.

13. The computer system of claim 1 wherein the ECU further comprises:
   a heat sink disposed proximate the CPU thermal path element; and
   a heat exchanger disposed proximate the system thermal path element;
   wherein the fan draws air into the ECU via an inlet vent of the top housing portion through the heat sink and the heat exchanger and expels the air out of the ECU via an exit vent of the top housing portion.

14. The computer system of claim 8 wherein the ECU further comprises a receptacle for receivng an AC adapter for receiving power to power the ECU and the PC.

* * * * *